United States Patent
Sindhu et al.

(10) Patent No.: US 7,613,199 B1
(45) Date of Patent: Nov. 3, 2009

(54) SYSTEMS AND METHODS FOR PERMITTING QUEUES TO OVERSUBSCRIBE

(75) Inventors: Pradeep Sindhu, Los Altos Hills, CA (US); Debashis Basu, San Jose, CA (US); Jayabharat Boddu, Santa Clara, CA (US); Avanindra Godbole, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 330 days.

(21) Appl. No.: 11/756,443

(22) Filed: May 31, 2007

Related U.S. Application Data

(63) Continuation of application No. 10/206,998, filed on Jul. 30, 2002, now Pat. No. 7,245,626.

(60) Provisional application No. 60/348,628, filed on Jan. 17, 2002.

(51) Int. Cl.
*H04L 12/28* (2006.01)

(52) U.S. Cl. .................. 370/412; 370/230; 370/235; 370/468; 710/56

(58) Field of Classification Search ............... None
See application file for complete search history.

(56) References Cited

U.S. PATENT DOCUMENTS

| | | | |
|---|---|---|---|
| 6,018,527 A | | 1/2000 | Yin et al. |
| 6,067,301 A | | 5/2000 | Aatresh |
| 6,438,141 B1 | * | 8/2002 | Hanko et al. ............. 370/477 |
| 6,470,016 B1 | | 10/2002 | Kalkunte et al. |
| 6,542,467 B2 | | 4/2003 | Umayabashi |
| 6,683,884 B1 | | 1/2004 | Howard |
| 6,687,781 B2 | | 2/2004 | Wynne et al. |
| 6,810,012 B1 | | 10/2004 | Yin et al. |
| 6,895,012 B2 | | 5/2005 | Amou et al. |
| 6,917,591 B2 | | 7/2005 | St. John |
| 6,959,002 B2 | | 10/2005 | Wynne et al. |
| 7,058,057 B2 | | 6/2006 | Dooley et al. |
| 7,123,622 B2 | * | 10/2006 | Bass et al. ............. 370/413 |
| 7,274,668 B2 | * | 9/2007 | Kyusojin et al. ............. 370/235 |
| 2001/0010682 A1 | * | 8/2001 | Schoenblum et al. ....... 370/232 |
| 2002/0075799 A1 | * | 6/2002 | Bennett ................. 370/229 |
| 2002/0087611 A1 | * | 7/2002 | Tanaka et al. .............. 709/1 |
| 2002/0087758 A1 | * | 7/2002 | Dixon .................. 710/56 |
| 2002/0097675 A1 | * | 7/2002 | Fowler et al. ............ 370/230 |
| 2002/0097734 A1 | * | 7/2002 | Amou et al. ............. 370/412 |
| 2002/0136200 A1 | * | 9/2002 | St. John ................ 370/352 |
| 2002/0141425 A1 | * | 10/2002 | Merani et al. ............ 370/412 |

(Continued)

OTHER PUBLICATIONS

U.S. Appl. No. 10/207,006, filed Jul. 30, 2002: Pradeep Sindhu et al., "Dequeuing And Congestion Control Systems And Methods," 42 pages Specification, Figs. 1-15.

(Continued)

*Primary Examiner*—Bob A Phunkulh
(74) *Attorney, Agent, or Firm*—Harrity & Harrity, LLP

(57) ABSTRACT

A system permits queues to use more than an allocated amount of bandwidth. The system allocates an amount of bandwidth to each of the queues and determines whether any of the queues is using less than the allocated amount of bandwidth. If so, the system reallocates the allocated bandwidth from one of the queues to at least one other one of the queues based on the amount of bandwidth used by each of the queues.

21 Claims, 15 Drawing Sheets

U.S. PATENT DOCUMENTS

2002/0163885 A1* 11/2002 Assa et al. ............... 370/230.1
2002/0176358 A1* 11/2002 Assa et al. .................. 370/229

OTHER PUBLICATIONS

U.S. Appl. No. 10/207,008, filed Jul. 30, 2002: Pradeep Sindhu et al., "Systems And Methods For Congestion Control Using Random Early Drop At Head Of Buffer," 40 pages Specification, Figs. 1-14.

U.S. Appl. No. 10/207,001, filed Jul. 30, 2002: Pradeep Sindhu et al., "Systems And Methods For Determining The Bandwidth Used By A Queue," 38 pages Specification, Figs. 1-14.

U.S. Appl. No. 10/207,002, filed Jul. 30, 2002: Pradeep Sindhu et al., "Systems And Methods For Dropping Data Using A Drop Profile," 44 pages Specification, Figs. 1-14.

U.S. Appl. No. 10/206,991, filed Jul. 30, 2002: Jayabharat Boddu et al., "Dequeuing And Congestion Control Systems And Methods For Single Stream Multicast," 42 pages Specification, Figs. 1-15.

Sally Floyd and Van Jacobson: "Random Early Detection Gateways for Congestion Avoidance," Lawrence Berkeley Laboratory, University of California, 1993, pp. 1-32.

* cited by examiner

SYSTEMS AND METHODS FOR PERMITTING QUEUES TO OVERSUBSCRIBE

RELATED APPLICATIONS

This application is a continuation of U.S. patent application Ser. No. 10/206,998, filed Jul. 30, 2002, which claims priority under 35 U.S.C. § 119 based on U.S. Provisional Application No. 60/348,628, filed Jan. 17, 2002, the disclosures of which are incorporated herein by reference.

BACKGROUND OF THE INVENTION

1. Field of the Invention

The present invention relates generally to congestion control during data transfer and, more particularly, to systems and methods for permitting buffers to transmit more than their statically allocated bandwidth.

2. Description of Related Art

Conventional network devices, such as routers, relay streams of data through a network from a source to a destination. Typically, the network devices include one or more memory subsystems to temporarily buffer data while the network devices perform network-related functions, such as route processing or accounting.

A data stream may be considered a pipe of data packets belonging to a communication between a particular source and one or more particular destinations. A network device may assign a variable number of queues (e.g., where a queue may be considered a logical first-in, first-out (FIFO) buffer) to a data stream. For a stream with n queues, the relationship of queues and streams may be represented by:

$$stream_{bandwidth} = \sum_{0}^{n-1} queue_{bandwidth}.$$

Typically, each of the queues is allocated a static amount of the stream's bandwidth. A problem that may arise is that some queues may be overutilized while other queues are underutilized. When this occurs, the network device may be forced to drop packet data from the overutilized queues to avoid becoming over-congested. As a result, the throughput of the network device decreases.

Therefore, there is a need for systems and methods for permitting queues to obtain more of a stream's bandwidth than originally allocated.

SUMMARY OF THE INVENTION

Systems and method consistent with the principles of the invention address this and other needs by permitting queues to oversubscribe (i.e., send more than the bandwidth originally allocated) when other queues in the stream are not fully using their allocated bandwidth.

In accordance with the principles of the invention as embodied and broadly described herein, a system permits queues to use more than an allocated amount of bandwidth. The system allocates an amount of bandwidth to each of the queues and determines whether any of the queues is using less than the allocated amount of bandwidth. If so, the system reallocates the allocated bandwidth from one of the queues to at least one other one of the queues based on the amount of bandwidth used by each of the queues.

In another implementation consistent with the principles of the invention, a network device includes dequeue engines and oversubscription engines that correspond to a group of queues. Each of the queue groups corresponds to a data stream. Each of the queues in each of the queue groups is allocated a portion of the total bandwidth of the corresponding data stream. Each of the dequeue engines is configured to dequeue data from the queues in the corresponding queue group. Each of the oversubscription engines is configured to determine whether any of the queues in the corresponding queue group is using less than the allocated bandwidth and reallocate the allocated bandwidth from one of the queues to at least one other one of the queues based on the one queue using less than the allocated bandwidth.

In a further implementation consistent with the principles of the invention, a system permits at least one queue to use more than an allocated amount of bandwidth. The system includes queues that temporarily store data belonging to a data stream, a bandwidth used memory area, an average bandwidth used memory area, and control logic. Each of the queues is allocated a portion of the total bandwidth of the data stream. The bandwidth used memory area stores a first value corresponding to each of the queues that represents an amount of bandwidth used by the queue during a time interval. The average bandwidth used memory area stores a second value corresponding to each of the queues that represents an average measurement of bandwidth use by the queue. The control logic reads the first value from the bandwidth used memory area for each of the queues, reads the second value from the average bandwidth used memory area for each of the queues, determines a time-averaged measurement of the bandwidth use by the queues based on the first and second values, and reallocates the allocated bandwidth from one of the queues to at least one other one of the queues based on the time-averaged measurement of the bandwidth use by the one queue.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents of the recited claim limitations.

Systems and methods consistent with the principles of the invention share a stream's bandwidth among its queues while providing the tightest possible latency bounds for delay sensitive queues. The systems and methods permit queues to share the bandwidth of underutilized queues.

Exemplary Network Device Configuration

Figure 1:
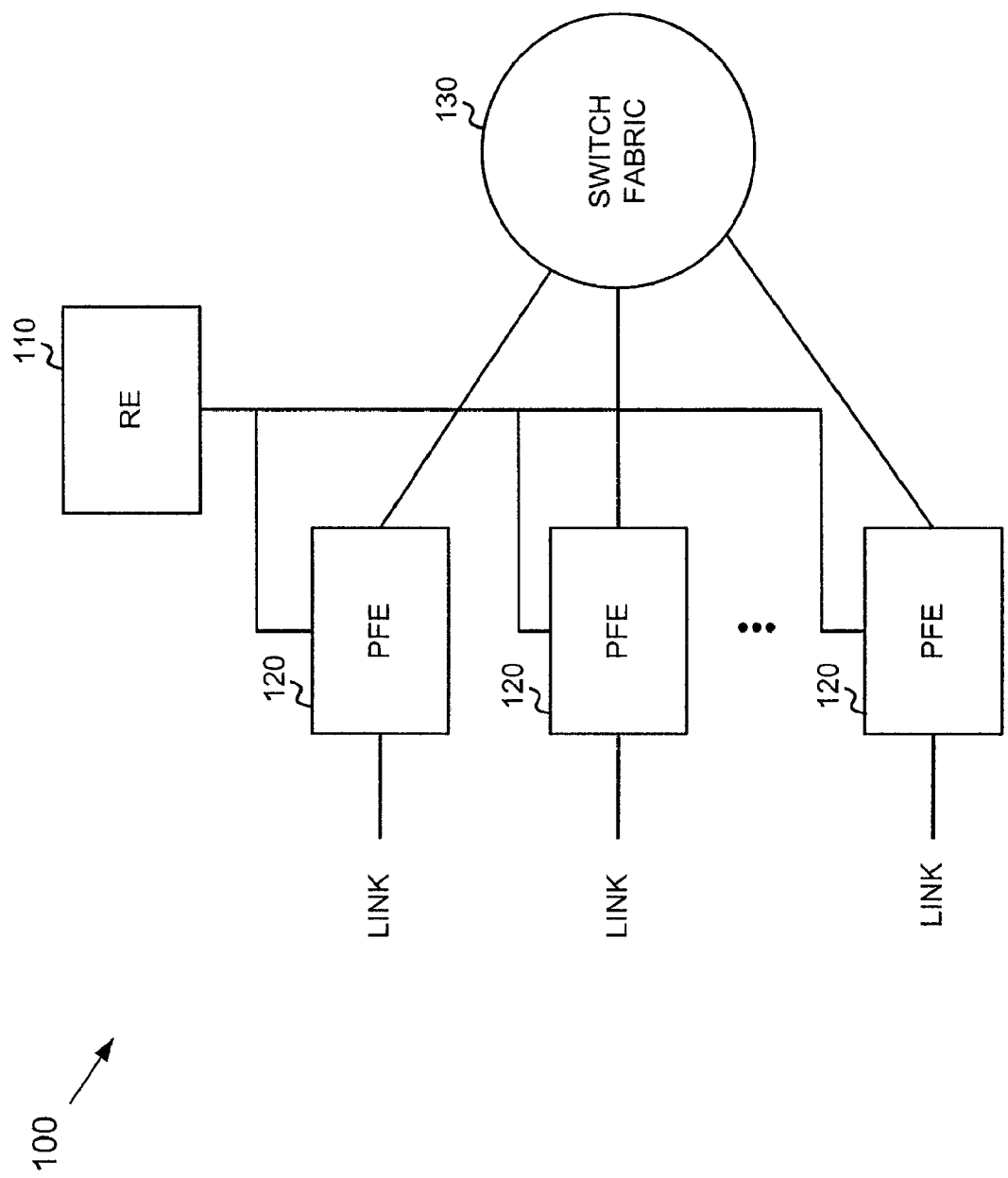
FIG. 1 is a diagram of an exemplary network device in which systems and methods consistent with the principles of the invention may be implemented.

FIG. 1 is a diagram of an exemplary network device in which systems and methods consistent with the principles of the invention may be implemented. In this particular implementation, the network device takes the form of a router 100. Router 100 may receive one or more packet streams from a physical link, process the stream(s) to determine destination information, and transmit the stream(s) on one or more links in accordance with the destination information.

Router 100 may include a routing engine (RE) 110 and multiple packet forwarding engines (PFEs) 120 interconnected via a switch fabric 130. Switch fabric 130 may include one or more switching planes to facilitate communication between two or more of PFEs 120. In an implementation consistent with the principles of the invention, each of the switching planes includes a single or multi-stage switch of crossbar elements.

RE 110 performs high level management functions for router 100. For example, RE 110 communicates with other networks and systems connected to router 100 to exchange information regarding network topology. RE 110 creates routing tables based on network topology information, creates forwarding tables based on the routing tables, and sends the forwarding tables to PFEs 120. PFEs 120 use the forwarding tables to perform route lookup for incoming packets. RE 110 also performs other general control and monitoring functions for router 100.

Each of PFEs 120 connects to RE 110 and switch fabric 130. PFEs 120 receive packets on physical links connected to a network, such as a wide area network (WAN), a local area network (LAN), etc. Each physical link could be one of many types of transport media, such as optical fiber or Ethernet cable. The packets on the physical link are formatted according to one of several protocols, such as the synchronous optical network (SONET) standard or Ethernet.

Figure 2:
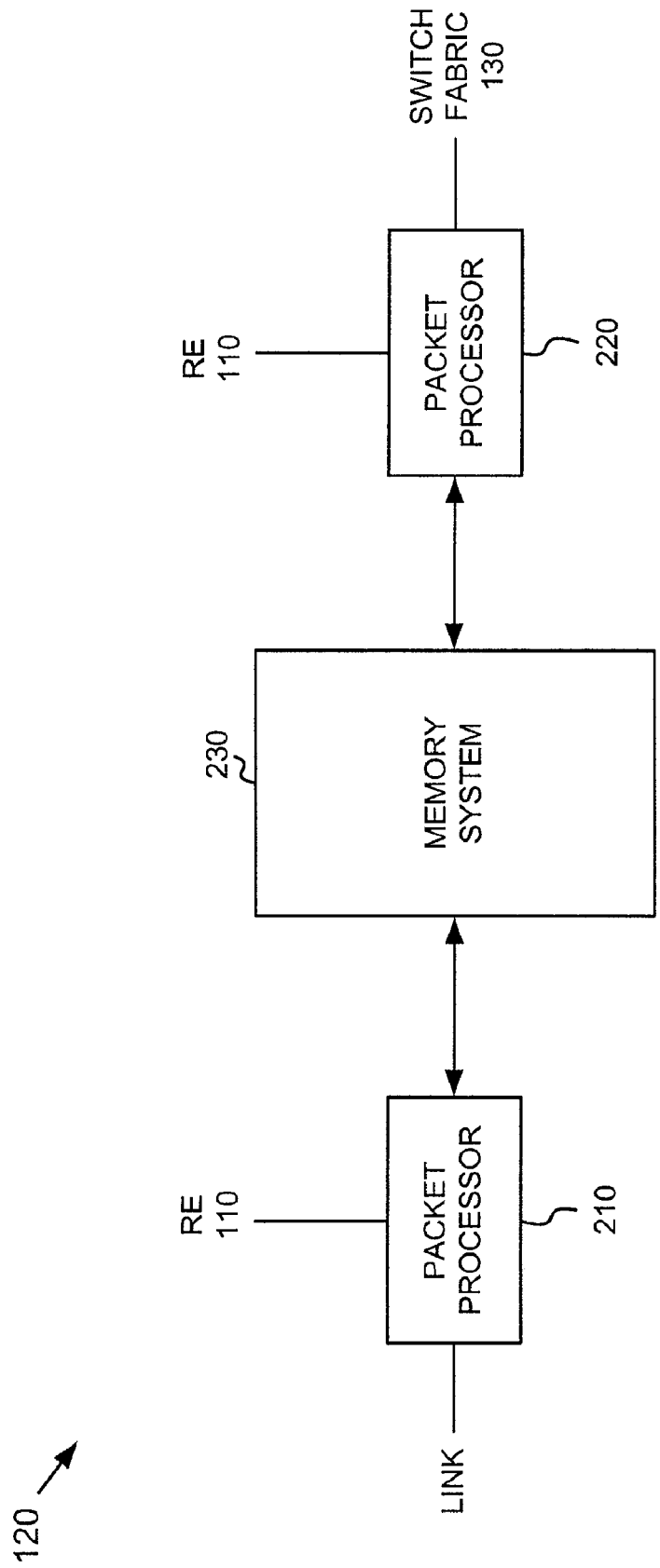
FIG. 2 is an exemplary diagram of a packet forwarding engine (PFE) of FIG. 1 according to an implementation consistent with the principles of the invention.

FIG. 2 is an exemplary diagram of a PFE 120 according to an implementation consistent with the principles of the invention. PFE 120 may include two packet processors 210 and 220, each connected to a memory system 230 and RE 110. Packet processors 210 and 220 communicate with RE 110 to exchange routing-related information. For example, packet processors 210 and 220 may receive forwarding tables from RE 110, and RE 110 may receive routing information from packet processor 210 that is received over the physical link. RE 110 may also send routing-related information to packet processor 210 for transmission over the physical link.

Packet processor 210 connects to one or more physical links. Packet processor 210 may process packets received from the incoming physical links and prepare packets for transmission on the outgoing physical links. For example, packet processor 210 may perform route lookup based on packet header information to determine destination information for the packets. For packets received from the links, packet processor 210 may store data in memory system 230. For packets to be transmitted on the links, packet processor 210 may read data from memory system 230.

Packet processor 220 connects to switch fabric 130. Packet processor 220 may process packets received from switch fabric 130 and prepare packets for transmission to switch fabric 130. For packets received from switch fabric 130, packet processor 220 may store data in memory system 230. For packets to be transmitted to switch fabric 130, packet processor 220 may read data from memory system 230.

Figure 3:
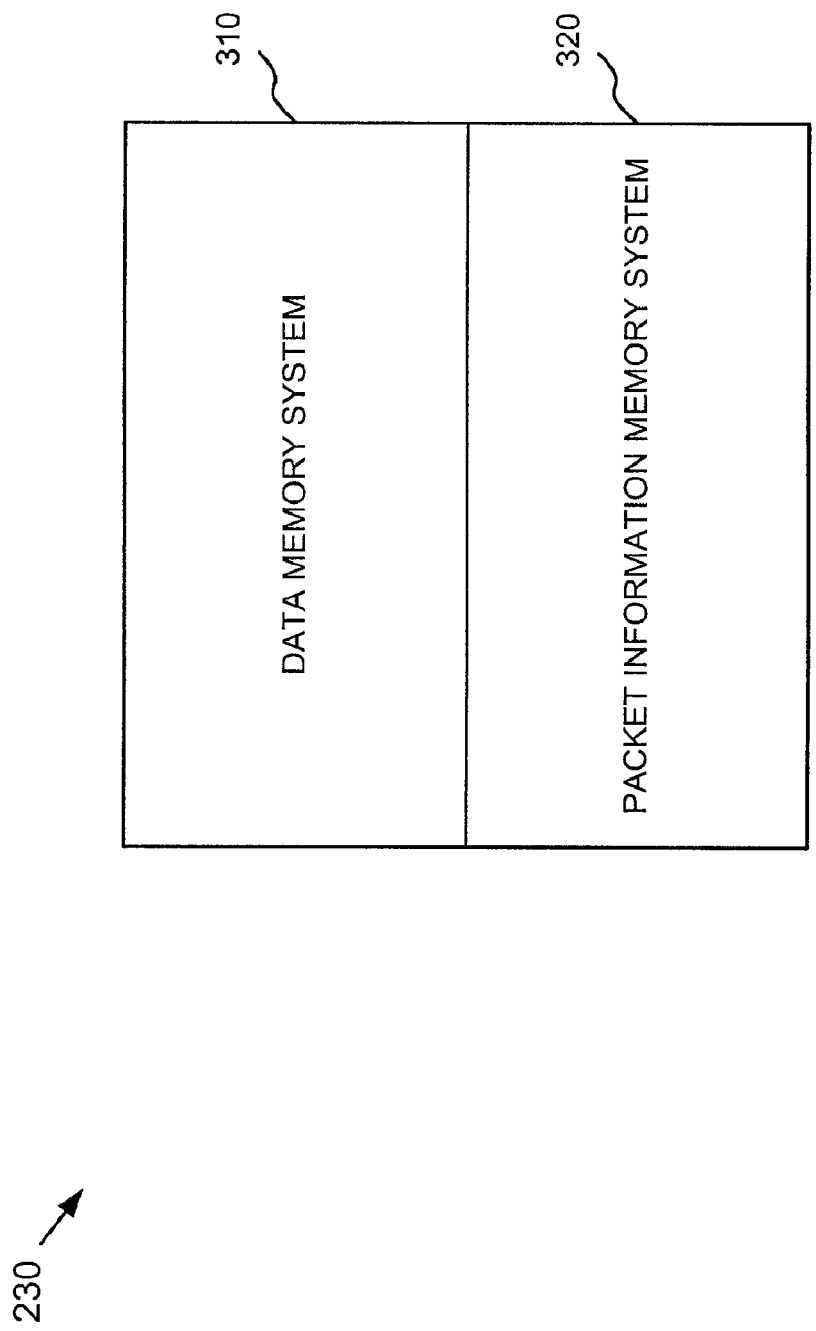
FIG. 3 is an exemplary diagram of a portion of the memory of FIG. 2 according to an implementation consistent with the principles of the invention.

Packet processors 210 and 220 may store packet data and other packet information, such as control and/or address information, within separate portions of memory system 230. FIG. 3 is an exemplary diagram of a portion of memory system 230 according to an implementation consistent with the principles of the invention. In FIG. 3, memory system 230 includes a data memory system 310 and a packet information memory system 320. Data memory system 310 may store the data from a packet, possibly in non-contiguous locations. Packet information memory system 320 may store the corresponding packet information in queues based on, for example, the packet stream to which the packet information corresponds. Other information, such as destination information and type of service (TOS) parameters for the packet, may be used in determining the particular queue(s) in which to store the packet information.

Figure 4:
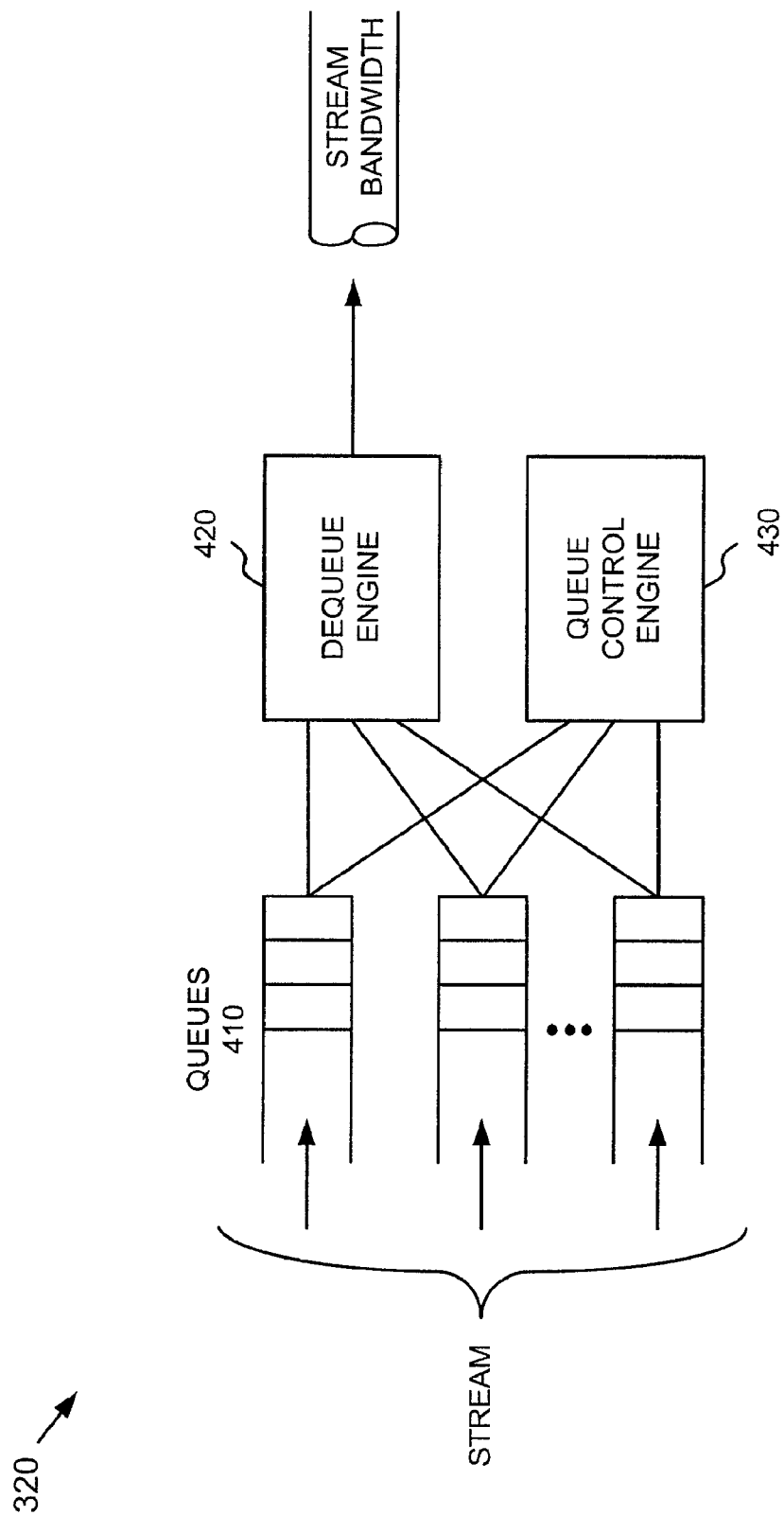
FIG. 4 is an exemplary diagram of a portion of the packet information memory of FIG. 3 according to an implementation consistent with the principles of the invention.

FIG. 4 is an exemplary diagram of a portion of packet information memory system 320 according to an implementation consistent with the principles of the invention. In FIG. 4, packet information memory system 320 includes queues 410, dequeue engine 420, and queue control engine 430. In addition, memory system 320 may include an enqueue engine (not shown) that stores data in queues 410.

Packet information memory system 320 may concurrently store packet information corresponding to multiple, independent packet streams. In an implementation consistent with the principles of the invention, memory system 320 may contain separate queues 410, dequeue engines 420, and queue control engines 430 corresponding to each of the packet streams. In other implementations, dequeue engine 420 and queue control engine 430 may correspond to multiple streams.

Queues 410 may include a group of first-in, first-out (FIFO) buffers that corresponds to a single stream. Other queues (not shown) may be provided for other packet streams. Queues 410 share the bandwidth of a single packet stream. In one implementation, each of queues 410 is allocated a static amount of packet information memory system 320 at configuration time. The amount of packet information memory system 320 allocated to a particular queue may be determined based on factors, such as the round trip time (Rtt), delay, and bandwidth associated with the stream, that minimize the chance that the queue will overflow.

Each of queues 410 may have three parameters associated with it: a weight between 0 and 1, a priority PR parameter that is either HI or LO, and a rate-control RC parameter that is either ON or OFF. A queue's weight determines the fraction of the stream's bandwidth B that is statically allocated to the queue. For a queue with weight w, the statically allocated bandwidth sba is equal to w*B. The sum of the weights of the queues (e.g., queues 410) for a stream equal one. In other words, the entire bandwidth of a stream is allocated to the queues associated with that stream.

The PR parameter specifies which of two priority levels (HI or LO) is associated with a queue. In other implementations, there may be more than two priority levels. Queues 410 associated with a HI priority may be serviced before queues 410 associated with a LO priority. Queues 410 at the same priority level may, for example, be serviced in a round robin manner.

The RC parameter determines whether a queue is allowed to oversubscribe (i.e., output more packet information than its statically allocated bandwidth). If RC is OFF, then the queue is permitted to send up to the stream bandwidth B (the total bandwidth for the stream). If RC is ON, then the queue is rate controlled and not permitted to send more than its statically allocated bandwidth sba.

Each of queues 410 is allocated a particular portion of data memory system 310 that stores packet data corresponding to the packet information stored by the queue. The size of the portion of data memory system 310 allocated to a particular queue (referred to as the static memory allocated sma) may be determined based on the stream's static bandwidth. For example, the sma may be defined as the round trip time (Rtt) multiplied by the statically allocated bandwidth sba. The statically allocated bandwidth sba was defined above. In another implementation, the sma may also take into account the speed of the stream.

The bandwidth allocated to a stream is fixed at B even though different queues within the stream may have dynamically changing bandwidth utilization, as will be described below. The stream itself never needs more than Rtt (round trip time, which is defined as the maximum time allowed for a packet to travel from the source to the destination and send an acknowledgement back)*B of data memory system 310. This amount of data memory system 310 may be denoted by MA.

A delay bandwidth buffer is an amount of packet information memory system 320 equal to the network round trip time (Rtt) multiplied by the sum of the bandwidths of the output interfaces. An efficient way to allocate the delay bandwidth buffer is to share it dynamically among queues across all output interfaces.

Dequeue engine 420 may include logic that dequeues packet information from queues 410. The order in which the streams are examined by dequeue engine 420 is referred to as the service discipline. For example, the service discipline may include round robin or time division multiplexing techniques. For each examination of a stream, dequeue engine 420 may select one of queues 410 and dequeue packet information from it. To select the queue, dequeue engine 420 may use the queue parameters w, PR, and RC. For each dequeue operation, the corresponding packet data in data memory system 310 may be read out and processed.

Queue control engine 430 may dynamically control the amount of data memory system 310 used by each queue. Since the total bandwidth for the stream is B, queue control engine 430 effectively controls the total amount of data memory system 310 used by queues 410 in a stream so that it does not exceed MA. The memory is allocated at the time the packet is received and reclaimed either by a drop process if the queue has exceeded its allocation (static and dynamic) or by a dequeue process when the packet is transmitted on a link.

Figure 5:
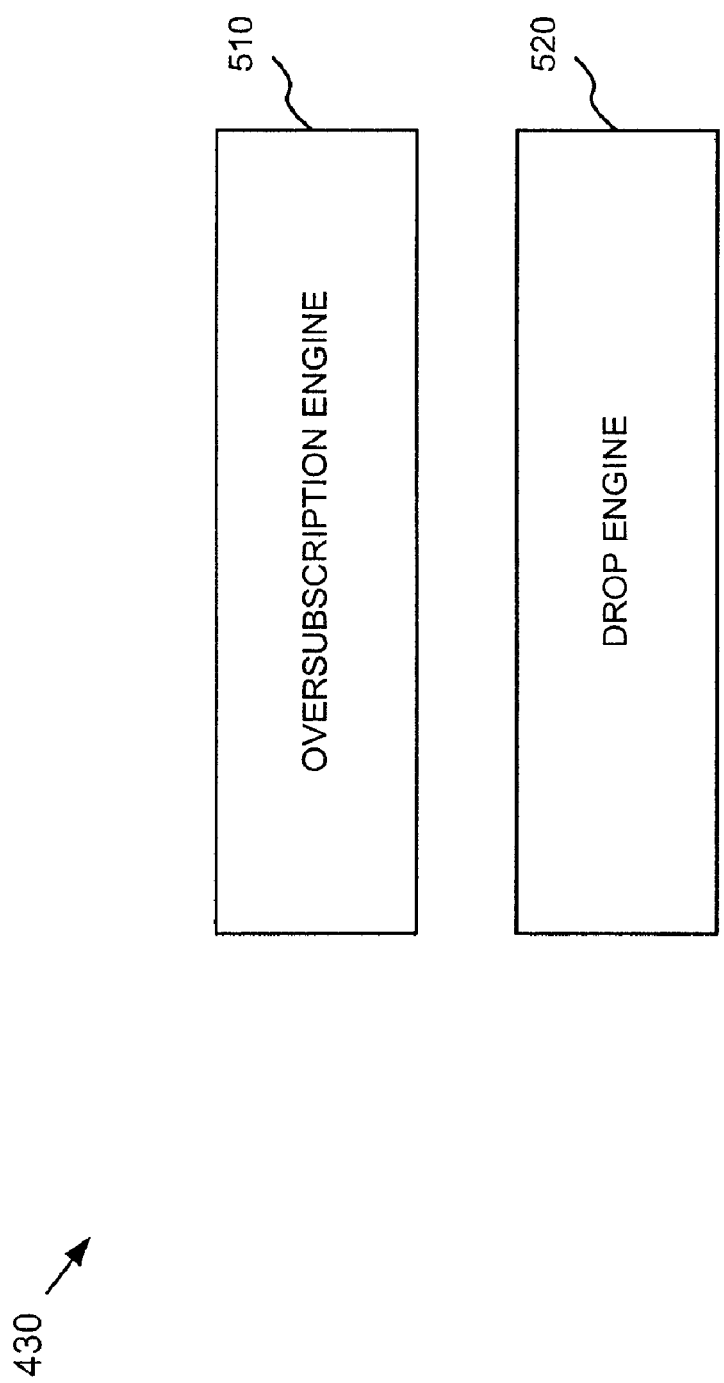
FIG. 5 is an exemplary diagram of the queue control engine of FIG. 4 according to an implementation consistent with the principles of the invention.

FIG. 5 is an exemplary diagram of queue control engine 430 according to an implementation consistent with the principles of the invention. Queue control engine 430 may include oversubscription engine 510 and drop engine 520. Oversubscription engine 510 may control whether any of queues 410 are permitted to output more packet information than their statically allocated bandwidth. Drop engine 520 may control whether to drop packet information from any of queues 410. Oversubscription engine 510 and drop engine 520 will be described in more detail below. While these engines are shown as separate, they may be integrated into a single engine or may otherwise share data between them (connection not shown).

Oversubscription Engine

Figure 6:
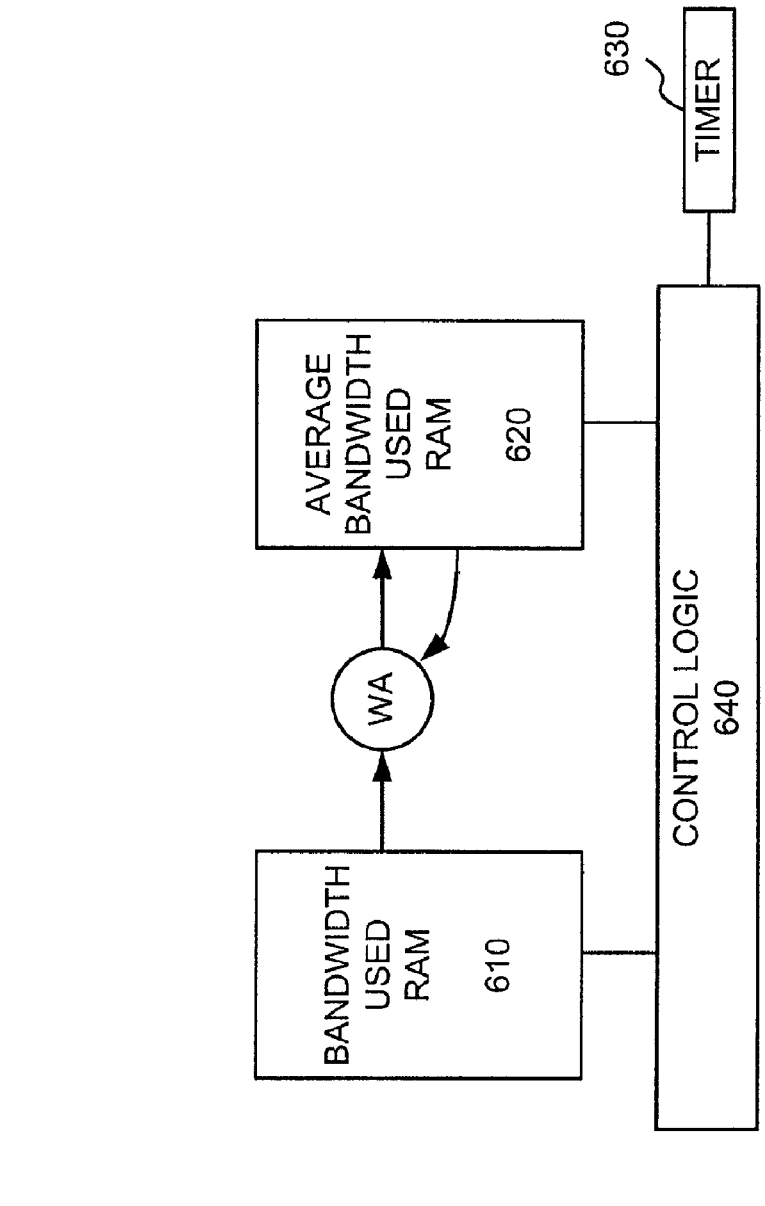
FIG. 6 is an exemplary diagram of the oversubscription engine of FIG. 5 according to an implementation consistent with the principles of the invention.

FIG. 6 is an exemplary diagram of oversubscription engine 510 according to an implementation consistent with the principles of the invention. Oversubscription engine 510 may include bandwidth used random access memory (RAM) 610, average bandwidth used RAM 620, timer 630, and control logic 640. In an alternate implementation, bandwidth used RAM 610 and average bandwidth used RAM 620 are registers implemented within one or more memory devices, such as a flip-flop.

Control logic 640 may include logic that coordinates or facilitates the operation of the components of oversubscription engine 510. For example, control logic 640 may perform calculations, write or read data to or from the RAMs, or simply pass information between components of oversubscription engine 510.

Bandwidth used RAM 610 may include multiple entries, such as one entry per queue. Each of the entries may store a variable that represents the instantaneous amount of bandwidth used (bs) by the queue during a time interval (Ta). When packet information is dequeued by dequeue engine 420 during the time interval Ta, the bs value may be incremented by the length of the corresponding packet. The bs value may be reset at periodic times identified by timer 630, such as the beginning or end of a time interval.

Average bandwidth used RAM 620 may include multiple entries, such as one entry per queue. Each of the entries may store data that represents a time-averaged measurement of the bandwidth used by the queue (bu) as computed during the time interval Ta. For example, the time-averaged measurement may be determined using an exponential weighted averaging with a decay coefficient chosen to make the computation as efficient as possible (e.g., two adds and a shift per time step). The weights in such an exponential weighted averaging function may be programmable.

Figure 7:
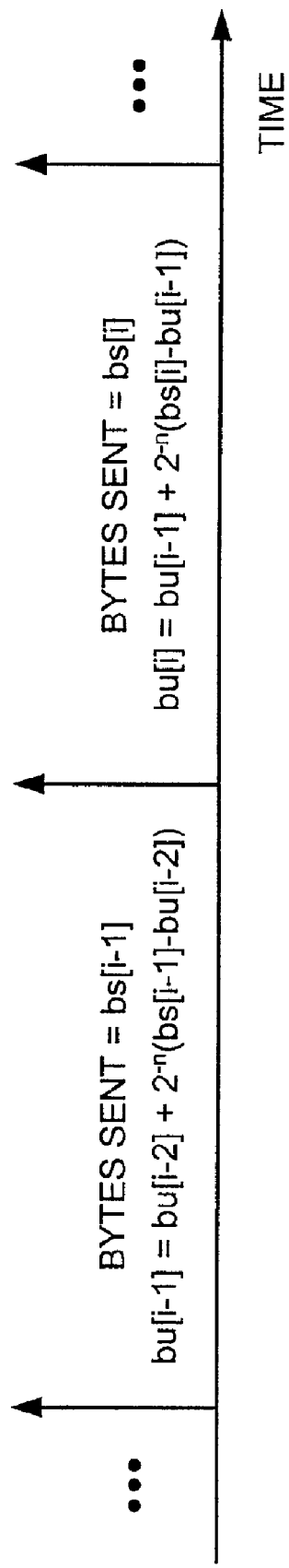
FIG. 7 is an exemplary time line that facilitates measurement of bandwidth use according to an implementation consistent with the principles of the invention.

FIG. 7 is an exemplary time line that facilitates measurement of bandwidth use according to an implementation consistent with the principles of the invention. The units of bu are bytes/time-step. Let bu[i] be the value of the average bandwidth used as computed in time step i. Let bs[i] be the number of bytes sent by the queue in time step i and n be an integer that determines the decay coefficient $(1-2^{-n})$. By expanding the recursion starting at bu[i]:

$$bu[i]=bu[i-1]+2^{-n}(bs[i]-bu[i-1])$$

$$bu[i]=bu[i-1]*(1-2^{-n})+bs[i]*2^{-n}$$

Substituting r (1−2^{−n}), the equation becomes:

$$bu[i]=bu[i-1]*r+bs[i]*(1-r)$$

$$=(bu[i-2]*r+bs[i-1]*(1-r))*r+bs[i]*(1-r)$$

$$=(1-r)*(bs[i]+bs[i-1]*r+bs[i-2]*r^2+bs[i-3]*r^3+\ldots).$$

As can be seen, the bandwidth used by a queue is a function of the bandwidth used by the queue in all the previous time intervals.

The final equation is an exponential weighted average with coefficient r. To get an idea of how many steps k it takes for the coefficients $r^k$ to become "small," the following binomial expansion may be used:

$$(1-2^{-n})^k \sim 1-k*2^{-n}$$

as long as k*2-n is much less than 1. This means that as long as k is significantly less than $2^n$, the terms are taken into account almost fully, but as k approaches $2^n$, $r^k$ will start to drop off rapidly and so the terms become less and less significant.

Returning to FIG. 6, timer 630 may include a programmable register and/or counter that identifies the times at which time averaging may be performed to generate bu. At the beginning of a programmable time interval Ta, the bs value in bandwidth used RAM 610 may be reset to zero. At the end of the time interval Ta, the current bs value may be read from bandwidth used RAM 610 and the average bu value (computed in the previous time interval) may be read from average bandwidth used RAM 620. A weighted averaging function may then be performed on these values, such as the one described above, and the resultant value may be stored in average bandwidth used RAM 620. The bs value in bandwidth used RAM 610 may then be reset to zero again at the beginning of the next time interval Ta+1 and the process repeated.

Control logic 640 may reallocate bandwidth to permit oversubscription based on the bandwidth actually used by queues 410. For example, control logic 640 may determine the average bandwidth bu used by each of queues 410 and reallocate bandwidth to certain ones of queues 410 if the queues permit oversubscription based on the RC parameter associated with the queues.

Figure 8:
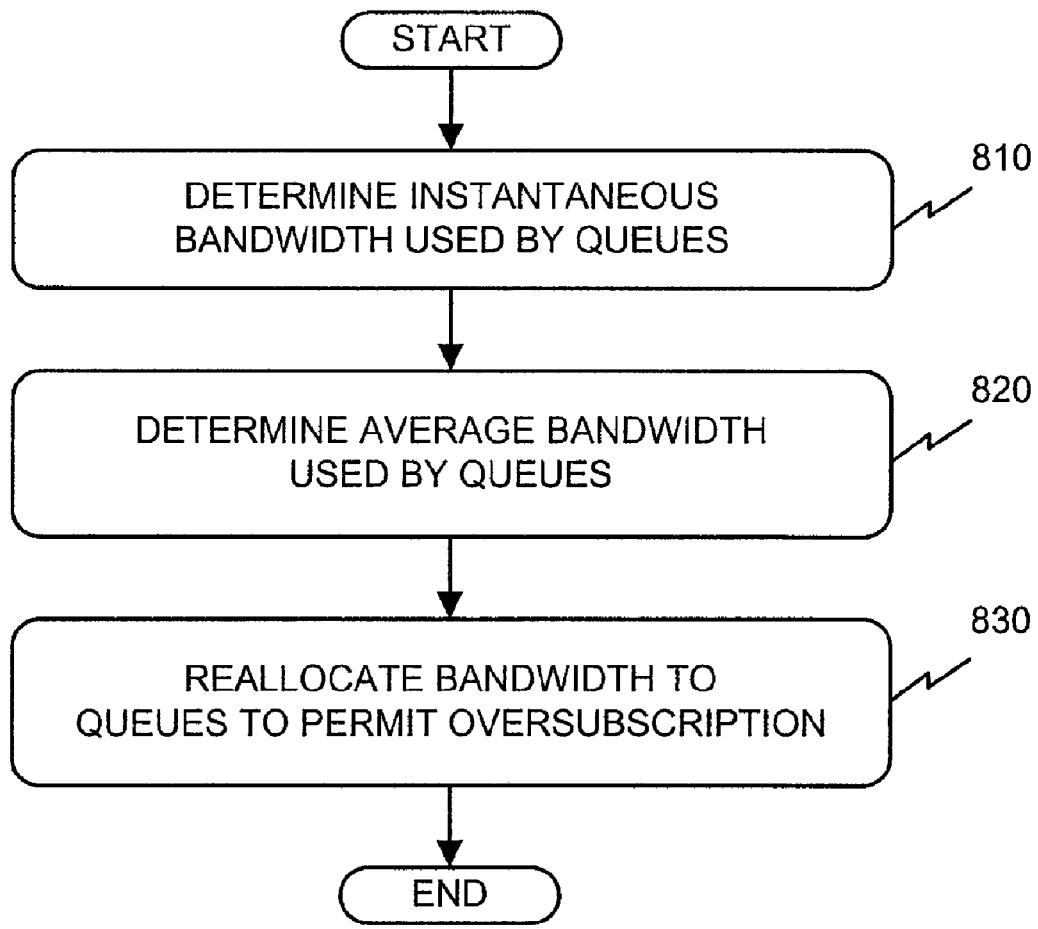
FIG. 8 is a flowchart of exemplary oversubscription processing according to an implementation consistent with the principles of the invention.

FIG. 8 is a flowchart of exemplary oversubscription processing according to an implementation consistent with the principles of the invention. In this implementation, control logic 640 performs oversubscription processing at the programmable time interval determined by timer 630. In other implementations, control logic 640 performs this processing at other times, which may be based on certain criteria, such as traffic flow-related criteria.

Processing may begin with control logic 640 determining the instantaneous bandwidth bs used by queues 410 (act 810). To make this determination, control logic 640 may read bs values, corresponding to queues 410, from bandwidth used RAM 610. As described above, the bs value for a queue may be calculated based on the length of the packet(s) corresponding to the packet information dequeued by the queue during a time interval.

Control logic 640 may use the bs values and the bu values from the previous time interval to determine the average bandwidth bu used by queues 410 during the current time interval (act 820). To make this determination, control logic 640 may take a time-averaged measurement of the bandwidth used by performing an exponential weighted averaging with a decay coefficient chosen to make the computation as efficient as possible (e.g., two adds and a shift per time step). A method for determining the average bandwidth bu has been described above.

Control logic 640 may use the average bandwidth bu to reallocate bandwidth to queues 410 (act 830). For example, control logic 640 may identify which of queues 410 permit oversubscription based on the RC parameters associated with queues 410. If the average bandwidth bu used by a queue is less than its statically allocated bandwidth, the unused portion of the bandwidth may be divided among the queues that are permitted to oversubscribe and need extra bandwidth. Any queue that is not permitted to oversubscribe cannot use any of the unused bandwidth.

Figure 9C:
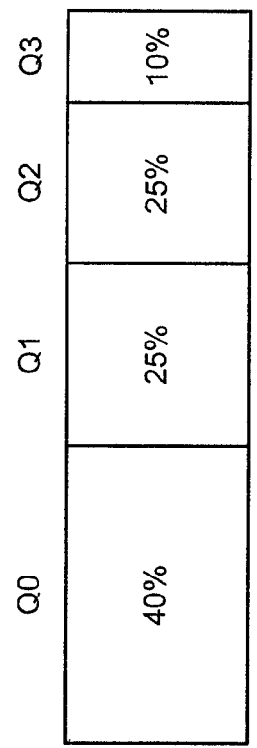
FIGS. 9A-9D are exemplary diagrams that illustrate oversubscription according to an implementation consistent with the principles of the invention.
Figure 9D:
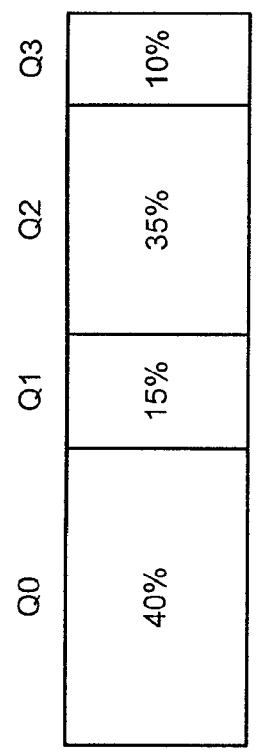
Figure 9A:
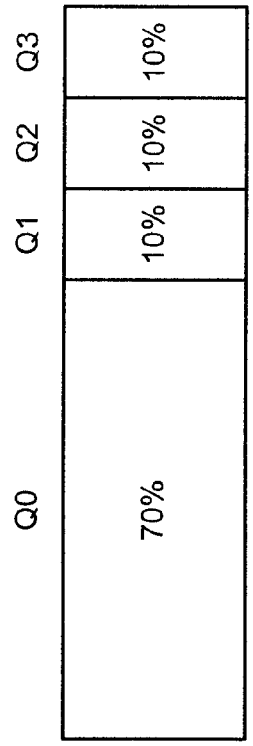

FIGS. 9A-9D are exemplary diagrams that illustrate oversubscription according to an implementation consistent with the principles of the invention. Assume that there are four queues Q0-Q3 that share a stream's bandwidth B. Assume further that Q0 has a weight of 0.7 and Q1-Q3 each has a weight of 0.1. In other words, Q0 is allocated 70% of the bandwidth B and each of Q1-Q3 is allocated 10% of the bandwidth B. FIG. 9A illustrates such a configuration.

Figure 9B:
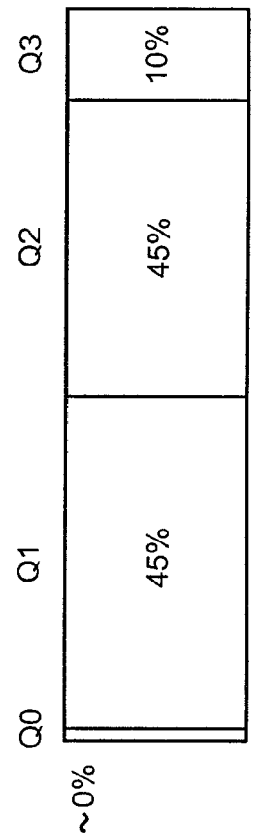

Assume further that RC is OFF for Q0-Q2 and ON for Q3. Therefore, Q0-Q2 are permitted to oversubscribe and Q3 is rate controlled and not permitted to oversubscribe. Assume that Q0 uses almost none of the bandwidth allocated to it. In this case, Q1 and Q2 may share the bandwidth unused by Q0. Accordingly, 0% of the bandwidth B is used by Q0, 45% is dynamically reallocated to each of Q1 and Q2, and 10% remains allocated to Q3. FIG. 9B illustrates such a configuration.

Assume at some later point in time that control logic 640 determines that traffic on Q0 increases based on the average bandwidth bu used by Q0, such that Q0 requires 40% of the bandwidth B. In this case, Q0 reclaims some of its bandwidth from Q1 and Q2. Since Q0 needs 40% of the bandwidth B, the remaining 30% unused by Q0 is divided between Q1 and Q2. Therefore, 40% of the bandwidth B is dynamically reallocated to Q0, 25% is dynamically reallocated to each of Q1 and Q2, and 10% remains allocated to Q3. FIG. 9C illustrates such a configuration. The reallocation of bandwidth is equal between Q1 and Q2 as long as they can use that bandwidth. If Q1 has just enough traffic to use 15% of the overall bandwidth, then Q2 will get 35% of the total bandwidth. FIG. 9D illustrates such a configuration.

As can be seen from the foregoing, the bandwidth allocated to queues 410 in a given time interval is related to both the queues' statically allocated bandwidth and the bandwidth used by the queues. This dynamic allocation process may be summarized as: (1) allocating the available bandwidth in proportion to the queues' statically allocated bandwidth; and (2) distributing the excess bandwidth among active queues in proportion to their excess bandwidths used in previous time intervals.

Drop Engine

Drop engine 520 may include RED logic that controls the amount of data memory system 310 used by queues 410 such that the average latency through queues 410 remains small even in the presence of congestion. The drop process is profiled in the sense that the probability of a packet information drop is not fixed, but is a user-specifiable function of how congested a queue is. Generally, the drop process may make its drop decision based on the ratio between the current queue length and the maximum permissible queue length.

Drop engine 520 makes its drop decision based on the state of queues 410, not on the state of the stream. Drop engine 520 may operate in a round robin fashion on all of the active queues. By design, it has a higher probability of examining more active queues rather than inactive queues to keep up with the data rate of a quickly-filling queue.

The drop decision is made at the head of queues 410 rather than at the tail, as in conventional systems. A benefit of dropping at the head of queues 410 is that congestion is signaled earlier to traffic sources, thereby providing tighter latency control. By comparison, a tail drop can result in the congestion signal being delayed by as much as Rtt compared to a head drop because a more recent packet is being dropped whose response time-out will expire later. Also, if queues 410 are allowed to oversubscribe and use more memory than allocated to them, then head drop provides a way to cut back excess memory use when a queue's bandwidth suddenly drops because a previously inactive queue has started to use its share of the bandwidth again.

Figure 10:
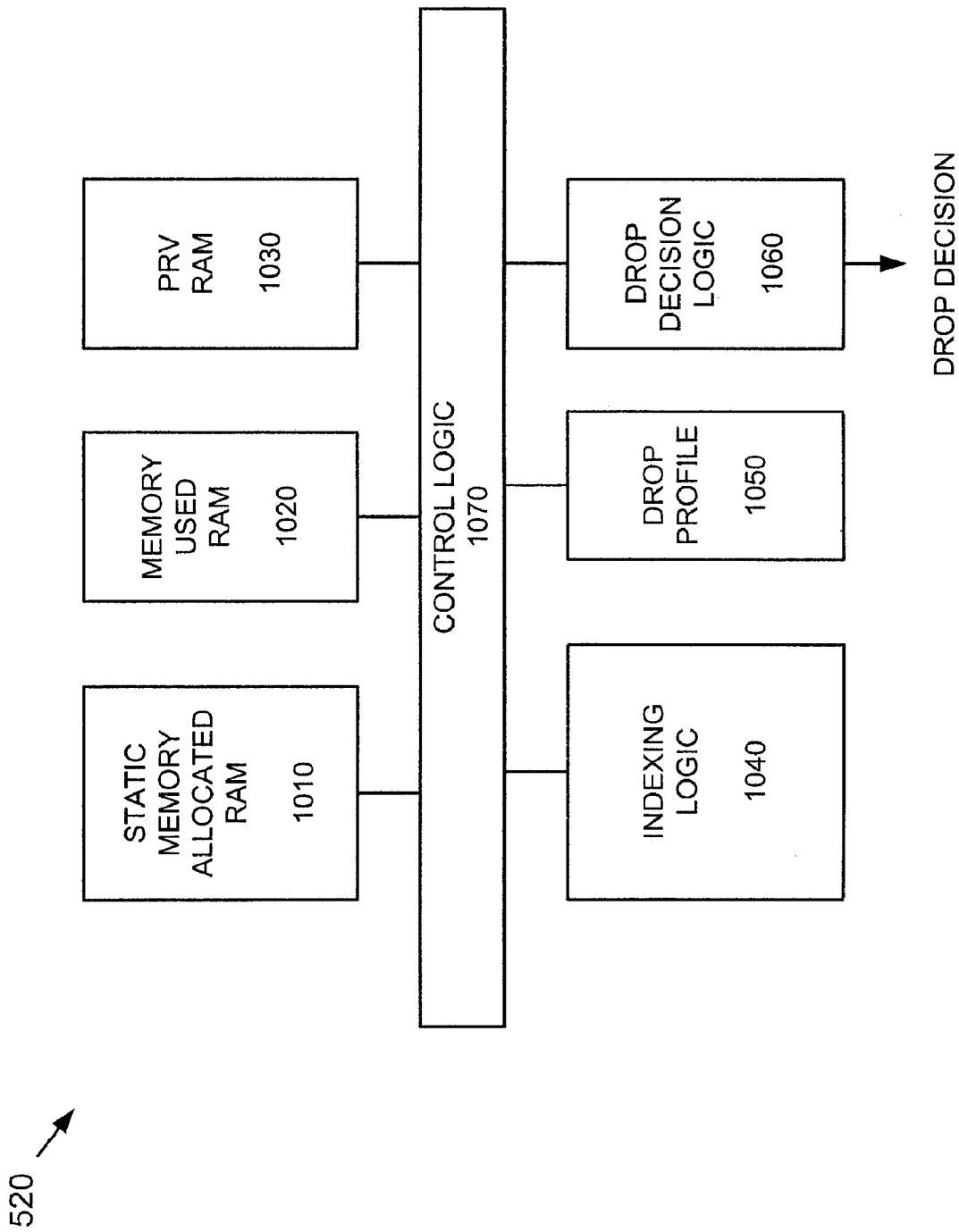
FIG. 10 is an exemplary diagram of the drop engine of FIG. 5 according to an implementation consistent with the principles of the invention.

FIG. 10 is an exemplary diagram of drop engine 520 according to an implementation consistent with the principles of the invention. Drop engine 520 may include static memory allocated RAM 1010, memory used RAM 1020, pending RED visit (PRV) RAM 1030, indexing logic 1040, drop profile 1050, drop decision logic 1060, and control logic 1070. In an alternate implementation, static allocated RAM 1010, memory used RAM 1020, and PRV RAM 1030 are registers implemented within one or more memory devices, such as a flip-flop.

Control logic 1070 may include logic that coordinates or facilitates the operation of the components of drop engine 520. For example, control logic 1070 may perform calculations, write or read to or from the RAMs, or simply pass information between components of drop engine 520.

Static memory allocated RAM 1010 may include multiple entries, such as one entry per queue. Each of the entries may store the variable sma, corresponding to the queue, that identifies the amount of data memory system 310 that should be made available to the queue (in the case where it is not allowed to oversubscribe due to RC being set or all of the other queues using their allocated bandwidth and, thereby, sparing no unused bandwidth). As defined above, sma is defined as the round trip time Rtt multiplied by the statically allocated bandwidth sba.

Memory used RAM 1020 may include multiple entries, such as one entry per queue. Each of the entries may store a variable mu that represents the amount of data memory system 310 actually being used by the queue. Storage space within data memory system 310 may be allocated dynamically at the time a packet is received and reclaimed at some time after the packet is transmitted by router 100. The variable mu, which counts bytes or cells (e.g., 64 byte data blocks) of data, may be used to track the amount of data memory system 310 used by the queue. When packet information is enqueued, the mu value may be incremented by the length of the corresponding packet. When packet information is dequeued by dequeue engine 420 or dropped by drop engine 430, the mu value may be decremented by the length of the corresponding packet.

PRV RAM 1030 may include multiple entries, such as one entry per queue. Each of the entries may store a variable prv that controls how many times the queue will be examined by drop engine 430. When packet information is enqueued, the prv value may be incremented by one. When packet information is dequeued by dequeue engine 420 or an examination of the queue by drop engine 430 occurs, the prv value may be decremented by one, if the prv value is greater than zero. The goal is to allow drop engine 430 to visit each packet at the head of the queue just once. A queue visited once may not be visited again unless the packet just visited got dropped or the packet gets dequeued by dequeue engine 420.

Indexing logic 1040 may include logic for creating an index into drop profile 1050. Drop profile 1050 may include a memory that includes multiple addressable entries. Each of the entries may store a value that indicates the probability of a drop. For example, assume that drop profile 1050 includes 64 entries that are addressable by a six bit address (or index). In an implementation consistent with the principles of the invention, each of the entries includes an eight bit number representing a drop probability. The drop probability may always be greater than or equal to zero.

Figure 11:
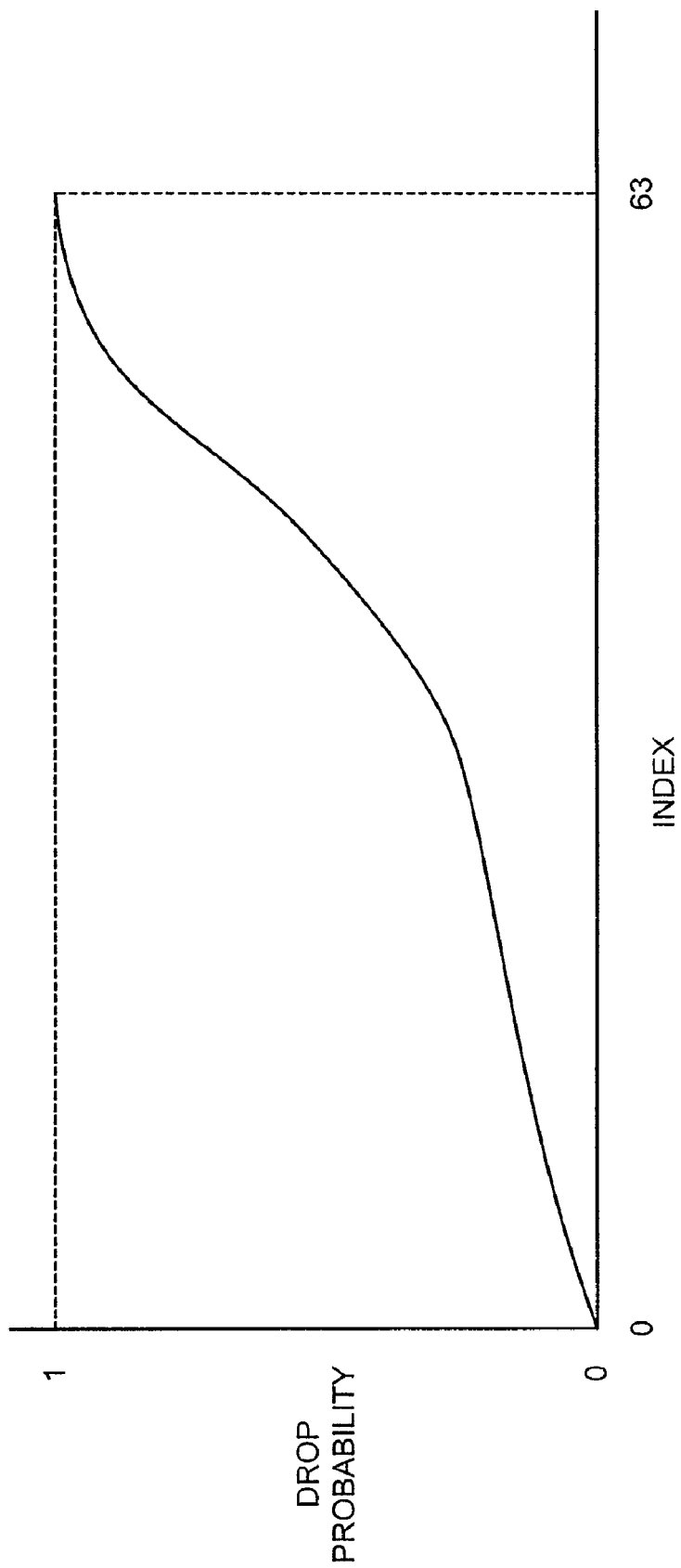
FIG. 11 is an exemplary graph of a drop profile consistent with the principles of the invention.

The relationship of drop probability to index may be expressed as a monotonically non-decreasing function. FIG. 11 is an exemplary graph of a drop profile consistent with the principles of the invention. As shown by the graph, the drop profile is a monotonically non-decreasing function with the drop probability of zero at index zero and the drop probability of one at index 63. In one implementation, an entry value of zero may be used to represent never drop, an entry value of 255 may be used to represent always drop, and entry values in between zero and 255 may represent a drop probability according to the relation:

$$\text{probability of drop} = (\text{entry value})/256.$$

Returning to FIG. 10, indexing logic 1040 may generate the index into drop profile 1050 using, for example, the expression:

$$\text{index} = (mu/\text{MAX})*64,$$

where MAX is the maximum of the values of sma (static memory allocated) and dma (dynamic memory allocated, which is the amount of data memory system 310 that should be made available to a particular queue and is defined as the average bandwidth used bu*(Rtt/Ta)). This may be considered a dynamic index because its value may change based on changes to the variable dma. In an alternate implementation, indexing logic 1040 may generate a static index using, for example, the expression:

$$\text{index} = (mu/\text{sma})*64.$$

This may be considered a static index because the value of sma will not change. According to an implementation consistent with the principles of the invention, the index generated is a six bit value. In other implementations, other size values are possible.

If the situation occurs where mu becomes greater than MAX, then the ratio of mu/MAX results in a value larger than one. When this happens, the index may contain a value that points to somewhere outside drop profile 1050. In this case, drop decision logic 1060 may consider this a must drop situation and drop the packet unless the packet contains an attribute, such as a keep alive attribute, that indicates that the packet should not be dropped.

In some situations, an index threshold may be used. As shown in FIG. 11, the drop profile is a monotonically non-decreasing function with the drop probability of zero at index zero and the drop probability of one at index 63. The index threshold may be set, such that if the index value generated by indexing logic 1040 is less than or equal to the threshold value, the lookup in drop profile 1050 may be skipped and the packet not dropped.

In another implementation consistent with the principles of the invention, packet attributes, such as the packet's Transmission Control Protocol (TCP) and/or Packet Level Protocol (PLP), may be used in conjunction with the index as an address into drop profile 1050. In this case, drop profile 1050 may include multiple profile tables, each having multiple addressable entries. The packet attributes may be used to select among the profile tables. For example, two bits representing the TCP and PLP of a packet may be used to select among four different profile tables in drop profile 1050. The index may then be used to identify an entry within the selected table. In this way, a certain set of attributes extracted from the packets may be used to perform an intelligent drop.

Drop decision logic 1060 may include logic that makes the ultimate drop decision based on the drop probability in drop profile 1050 or other factors as described above. In other words, drop decision logic 1060 translates the drop probability into a drop decision for the packet information examined by drop engine 520.

Figure 12:
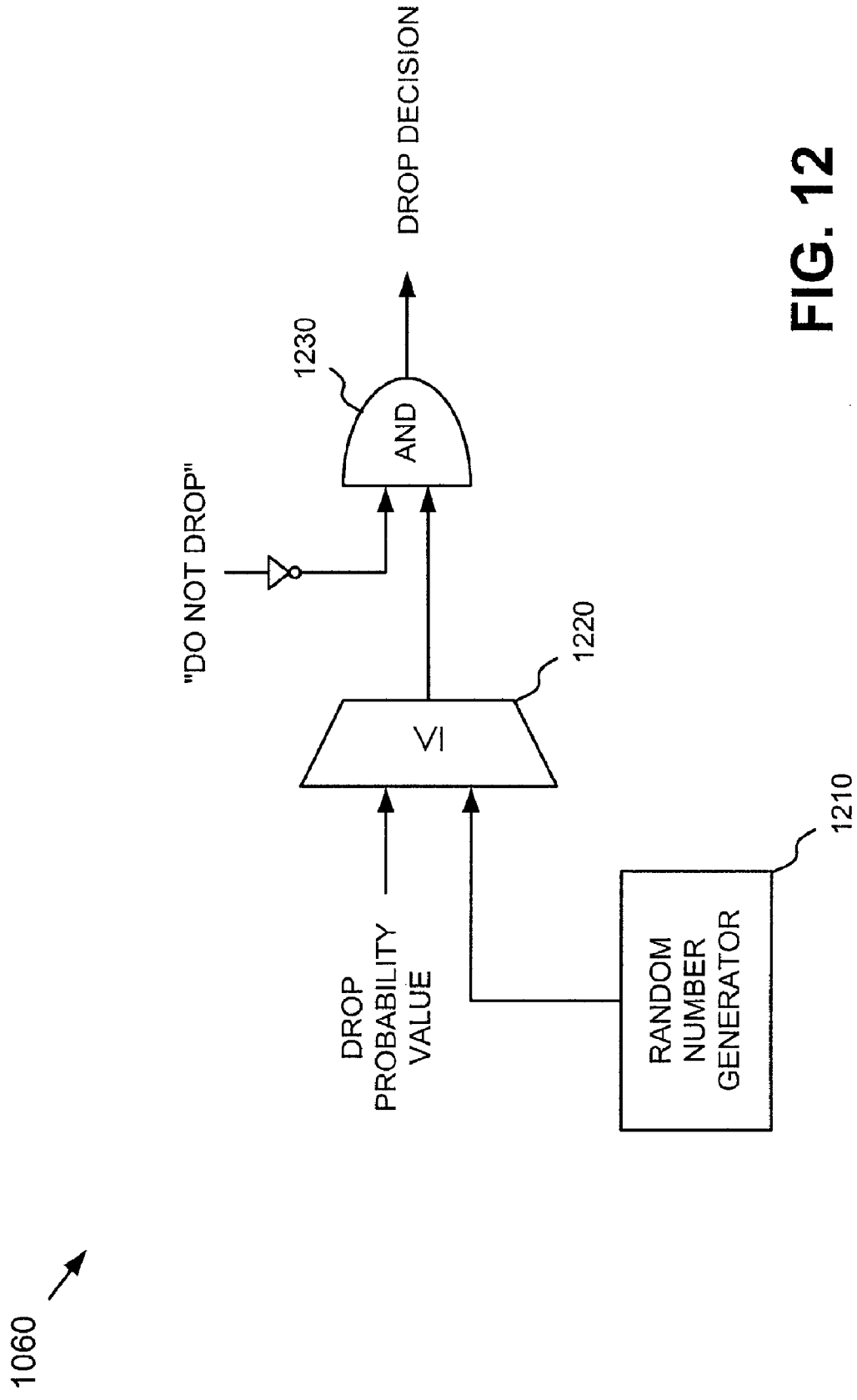
FIG. 12 is an exemplary diagram of the drop decision logic of FIG. 10 according to an implementation consistent with the principles of the invention.

FIG. 12 is an exemplary diagram of drop decision logic 1060 according to an implementation consistent with the principles of the invention. Drop decision logic 1060 includes random number generator 1210, comparator 1220, and AND gate 1230. Random number generator 1210 may include a pseudo random number generator, such as a linear feedback shift register that creates a pseudo random number that has a uniform distribution between zero and one. Random number generator 1210 may generate a random number that has the same number of bits as the drop probability value from drop profile 1050. To increase randomness, however, random number generator 1210 may generate a random number that has a greater number of bits as the drop probability value from drop profile 1050.

Random number generator 1210 may implement functions as represented by the following:

```
lfsr_galois(int state) {
    int x0, x5, x12;
    if (0x0001 & state) {
        state=state>>1;
        state=state ^0x8000^0x0800^0x0010;
    }
    else state=state>>1;
    return (state);
}
``` to generate the random number.

Comparator 1220 may compare the random number from random number generator 1210 to the drop probability value from drop profile 1050. AND gate 1230 may perform a logical AND operation on the result of the comparison and a "DO NOT DROP" signal, which may be generated based on the presence or absence of an attribute, such as a keep alive attribute, that may be extracted from the packet. In an implementation consistent with the principles of the invention, comparator 1220 and AND gate 1230 may be designed to output a drop decision to: (1) drop the packet information if the random number is less than the drop probability value and the DO NOT DROP signal indicates that the packet information may be dropped; (2) not drop the packet information if the random number is less than the drop probability value and the DO NOT DROP signal indicates that the packet information should not be dropped; and (3) not drop the packet information if the random number is not less than the drop probability value regardless of the value of the DO NOT DROP signal.

Figure 13A:
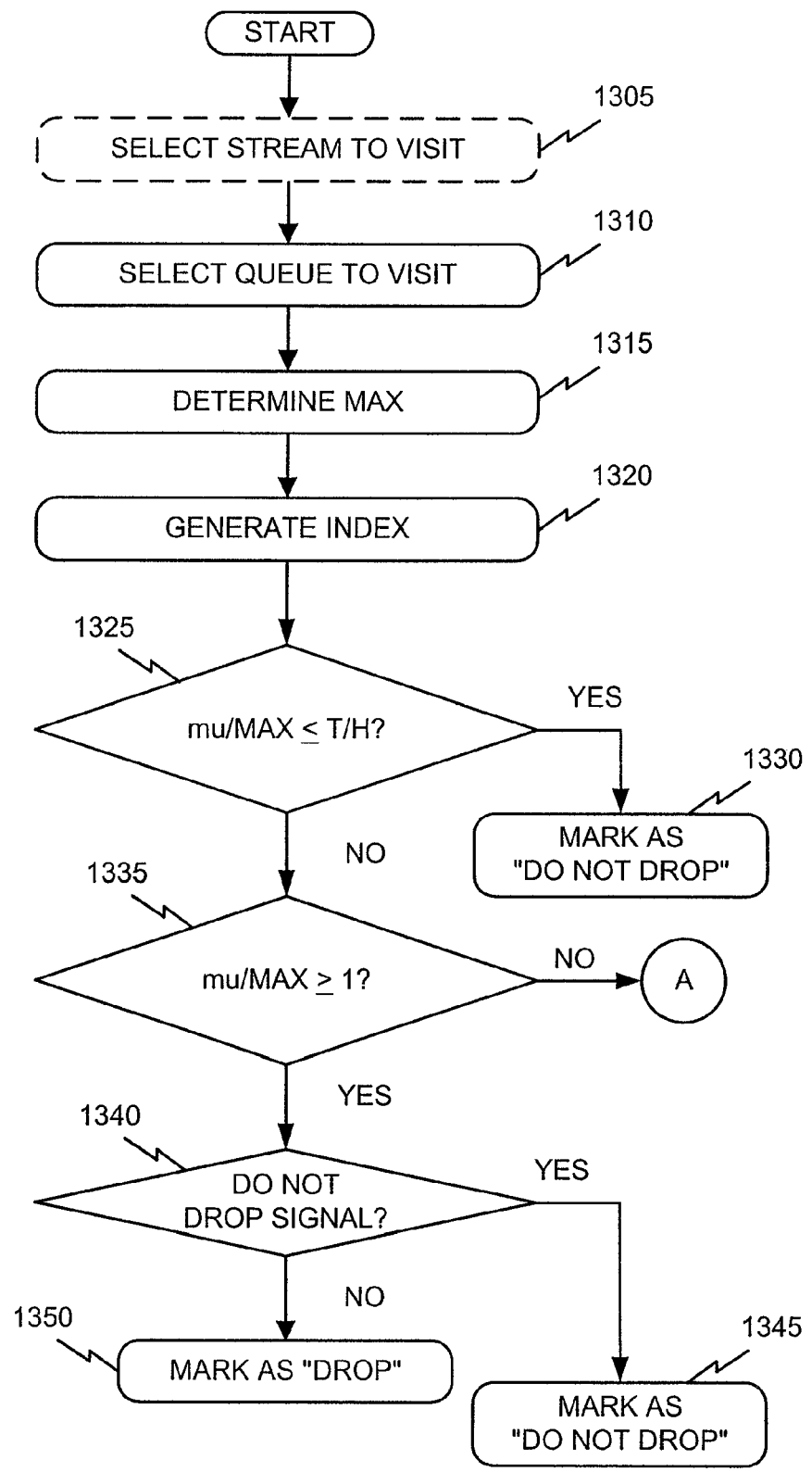
FIGS. 13A and 13B are flowcharts of exemplary processing by the drop engine of FIG. 10 according to an implementation consistent with the principles of the invention.
Figure 13B:
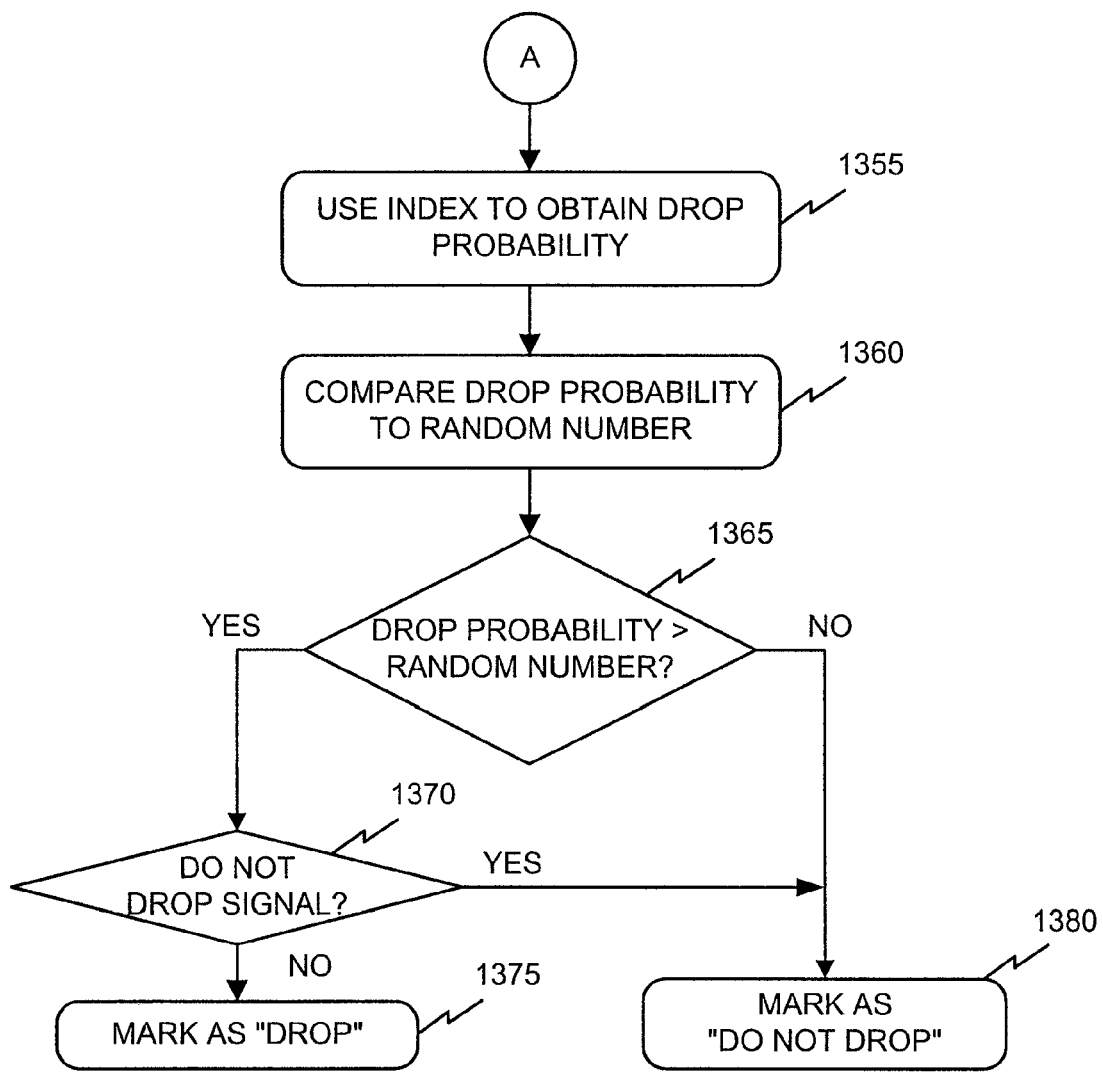

FIGS. 13A and 13B are flowcharts of exemplary processing by drop engine 520 according to an implementation consistent with the principles of the invention. Drop engine 520 may operate in parallel to dequeue engine 420. Therefore, packet information memory system 320 may include mechanisms to arbitrate between drop engine 520 and dequeue engine 420 competing for the same resource (i.e., the same packet information at the head of a queue). In implementations consistent with the principles of the invention, drop engine 520 and dequeue engine 420 may be permitted to access different packet information on the same queue.

Optionally, drop engine 520 may select a stream to examine (act 1305) (FIG. 13A). For example, drop engine 520 may use a round robin technique or another technique to determine which of the possible streams to examine next. Alternatively, in another implementation, drop engine 520 may consider all of the queues in a round robin manner without first selecting a stream. In this case, act 1305 may be unnecessary.

Once a stream has been selected, if necessary, drop engine 520 may select a queue to examine based on, for example, the queues' prv values (act 1310). The drop engine 520 may use round robin arbitration to select the next queue with a prv value greater than zero.

Alternatively, drop engine 520 may construct two bit vectors (HIVec and LOVec) and perform a round robin over these vectors to select the next queue to examine. The HIVec and LOVec vectors may be defined as follows:

for queue$_i$, where i=0 to total number of queues:
   if (mu$_i$>MAX$_i$), HIVec[i]=1;
   else {
     if (mu$_i$<(MAX$_i$/X)), LOVec[i]=0,
     else LOVec[i]=(prv[i]>0)
   } where X is an integer, such as 16. This conserves drop engine 520 examinations of a queue when mu is small compared to MAX and forces drop engine 520 examinations when mu exceeds MAX. When mu is very small compared to MAX/X, the drop probability will be small. Keeping LOVec reset allows drop engine 520 to visit other more active queues.

Figure 14:
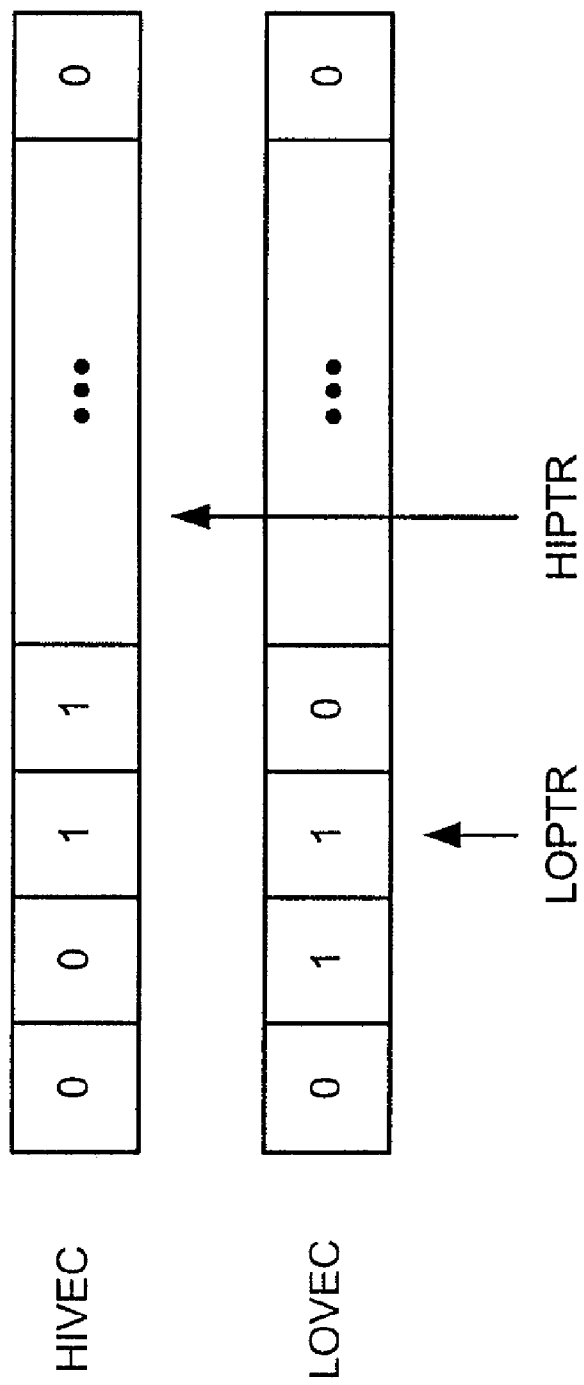
FIG. 14 is an exemplary diagram of queue selection using HIVec and LOVec vectors according to an implementation consistent with the principles of the invention.

FIG. 14 is an exemplary diagram of queue selection using the HIVec and LOVec vectors according to an implementation consistent with the principles of the invention. Drop engine 520 may use the two bit vectors HIVec and LOVec to select the next queue to examine. Drop engine 520 may begin searching HIVec at HIPtr+1 looking for the first queue i that has HIVec[i]=1. If there is no such queue, then drop engine 520 may search LOVec starting at LOPtr+1 looking for the first queue i that has LOVec[i]=1.

Returning to FIG. 13A, when drop engine 520 finds a queue i, it determines the variable dma (i.e., the average bandwidth used bu*Rtt) and, from it, the variable MAX (act 1315). As described above, MAX is defined as the maximum of the values of sma from static memory allocated RAM 1010 and dma. From MAX, drop engine 520 generates an index into drop profile 1050 (act 1320). As described above, the index may be defined as: mu/MAX*64. In this case, the generated index may be a six bit number. If the ratio of mu/MAX results in a value greater than one, then drop engine 520 may drop the packet (if the packet does not contain an attribute, such as a keep alive attribute). If the resulting index value is below some threshold, drop engine 520 may bypass the drop profile lookup and not drop the packet.

If an index threshold (T/H) is used, drop engine 520 may compare mu/MAX to the threshold to determine whether mu/MAX is less than or equal to the threshold (act 1325). If mu/MAX is less than or equal to the threshold, drop engine 520 may mark the packet as not to be dropped (act 1330). Marking may be done by simply setting a bit associated with the packet or by not dropping packet information from the queue.

If mu/MAX is greater than the threshold, drop engine 520 may determine whether mu/MAX is greater than or equal to one (act 1335). If so, then drop engine 520 may determine whether the packet includes a packet attribute, such as a keep alive attribute, that indicates that it is not to be dropped (act 1340). The presence or absence of this packet attribute may be used to generate the DO NOT DROP signal. If the DO NOT DROP signal indicates that the packet should not be dropped, then drop engine 520 may mark the packet as not to be dropped (act 1345). Otherwise, drop engine 520 may mark the packet for dropping (act 1350).

If mu/MAX is less than one, however, drop engine 520 may use the index to access drop profile 1050 and obtain a drop probability (act 1355) (FIG. 13B). If drop profile 1050 contains more than one profile table, drop engine 520 may use packet attributes to select one of the profile tables. Drop engine 520 may then use the index as an address into the selected profile table and read a drop probability value therefrom.

Drop engine 520 may determine a drop decision by comparing the drop probability value to a random number (acts 1360 and 1365). The random number may be generated by random number generator 1210. If the random number is less than the drop probability value, drop engine 520 may determine whether the packet includes a packet attribute, such as a keep alive attribute, that indicates that it is not to be dropped (act 1370). The presence or absence of this packet attribute may be used to generate the DO NOT DROP signal.

If the random number is less than the drop probability value and the DO NOT DROP signal indicates that the packet may be dropped, then drop engine 520 may mark the packet for dropping (act 1375). If the DO NOT DROP signal, in this case, indicates that the packet is not to be dropped, then drop engine 520 may mark the packet as not to be dropped (act 1380). If the random number is not less than the drop probability value, regardless of the value of the DO NOT DROP signal, then drop engine 520 may mark the packet as not to be dropped (act 1380). Marking may be done by simply setting a bit associated with the packet or by dropping or not dropping packet information from the queue.

In response to a decision to drop, drop engine 520 may remove the associated packet information from the queue. Alternatively, the queue may discard the packet information itself when instructed by drop engine 520.

CONCLUSION

Systems and methods, consistent with the principles of the invention, permit queues to use more than their statically allocated bandwidth. As a result, the occurrence of congestion and, thus, the dropping of data may be reduced.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, dequeue engine 420 and queue control engine 430 have been described as separate components. In other implementations consistent with the principles of the invention, the engines may be integrated into a single engine that both dequeues and drops packet information.

Also, while some memory elements have been described as RAMs, other types of memory devices may be used in other implementations consistent with the principles of the invention.

Certain portions of the invention have been described as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A network device, comprising:
    a plurality of queues to temporarily store data associated with a stream of data, each of the plurality of queues having an associated weight and an associated rate-control parameter, the weight associated with one of the plurality of queues identifying a fraction of a total bandwidth of the stream assigned to the one of the plurality of queues, the rate-control parameter associated with the one of the plurality of queues identifying whether the one of the plurality of queues is permitted to oversubscribe; and
    an oversubscription engine to:
        determine an amount of bandwidth used by each of the plurality of queues, and
        reallocate a portion of the fraction of the total bandwidth from a first one of the plurality of queues to one or more other ones of the plurality of queues based on the amount of bandwidth used by each of the plurality of queues, the weight associated with the first queue, and the rate-control parameter associated with each of the plurality of queues.

2. The network device of claim 1, where the oversubscription engine is further configured to:
    read the rate-control parameter associated with each of the plurality of queues,
    identify which of the plurality of queues are permitted to oversubscribe based on the associated rate-control parameter, and
    determine a manner for reallocating the portion of the fraction of the total bandwidth from the first queue to the identified queues.

3. The network device of claim 1, where the oversubscription engine is further configured to:
    reclaim at least some of the portion of the fraction of the total bandwidth for the first queue when needed by the first queue.

4. The network device of claim 1, where when reallocating the portion of the fraction of the total bandwidth, the oversubscription engine is configured to:
    distribute, in a current time interval, excess bandwidth from the first queue among the one or more other ones of the plurality of queues in proportion to bandwidth used by the one or more other ones of the plurality of queues in previous time intervals.

5. The network device of claim 1, where a priority parameter is associated with each of the plurality of queues; and
    the network device further comprises:
    a dequeue engine to select a queue of the plurality of queues to service based on the priority parameter associated with each of the plurality of queues.

6. The network device of claim 1, further comprising:
    a dequeue engine to select a queue of the plurality of queues to service based on at least one of the weights or the rate-control parameters associated with the plurality of queues.

7. The network device of claim 1, where when determining an amount of bandwidth used by each of the plurality of queues, the oversubscription engine is configured to determine an average amount of bandwidth used by each of the plurality of queues over a plurality of time intervals.

8. The network device of claim 1, where the oversubscription engine is configured to:
determine a statically allocated bandwidth associated with the first queue based on the weight associated with the first queue,
determine whether the amount of bandwidth used by the first queue is less than the statically allocated bandwidth associated with the first queue, and
identify an unused portion of the fraction of the total bandwidth assigned to the first queue for reallocation to the one or more other ones of the plurality of queues when the amount of bandwidth used by the first queue is less than the statically allocated bandwidth associated with the first queue.

9. A system, comprising:
means for providing a plurality of queues to temporarily store data associated with a stream of data;
means for associating a weight with each of the plurality of queues, the weight associated with one of the plurality of queues identifying a fraction of a total bandwidth of the stream assigned to the one of the plurality of queues;
means for allocating a static amount of bandwidth to each of the plurality of queues based on the weight associated with each of the plurality of queues;
means for associating a rate-control parameter with each of the plurality of queues, the rate-control parameter associated with the one of the plurality of queues identifying whether the one of the plurality of queues is permitted to oversubscribe;
means for determining an amount of bandwidth used by each of the plurality of queues; and
means for reallocating a portion of the fraction of the total bandwidth from a first one of the plurality of queues to one or more other ones of the plurality of queues based on the amount of bandwidth used by each of the plurality of queues, the static amount of bandwidth allocated to the first queue, and the rate-control parameter associated with each of the plurality of queues.

10. The system of claim 9, further comprising:
means for reading the rate-control parameter associated with each of the plurality of queues;
means for identifying which of the plurality of queues are permitted to oversubscribe based on the associated rate-control parameter; and
means for determining a manner for reallocating the portion of the fraction of the total bandwidth from the first queue to the identified queues.

11. The system of claim 9, further comprising:
means for reclaiming at least some of the portion of the fraction of the total bandwidth for the first queue when needed by the first queue.

12. The system of claim 9, where the means for reallocating the portion of the fraction of the total bandwidth includes:
means for distributing, in a current time interval, excess bandwidth from the first queue among the one or more other ones of the plurality of queues in proportion to bandwidth used by the one or more other ones of the plurality of queues in previous time intervals.

13. The system of claim 9, further comprising:
means for associating a priority parameter with each of the plurality of queues; and
means for selecting a queue of the plurality of queues to service based on the priority parameter associated with each of the plurality of queues.

14. The system of claim 9, where the means for determining an amount of bandwidth used by each of the plurality of queues includes means for determining an average amount of bandwidth used by each of the plurality of queues over a plurality of time intervals.

15. The system of claim 9, further comprising:
means for determining whether the amount of bandwidth used by the first queue is less than the static amount of bandwidth allocated to the first queue; and
means for identifying an unused portion of the fraction of the total bandwidth assigned to the first queue for reallocation to the one or more other ones of the plurality of queues when the amount of bandwidth used by the first queue is less than the static amount of bandwidth allocated to the first queue.

16. A method, comprising:
providing a plurality of queues to temporarily store data;
allocating a fraction of a total bandwidth to each of the plurality of queues;
associating a rate-control parameter with each of the plurality of queues, the rate-control parameter associated with one of the plurality of queues identifying whether the one of the plurality of queues is permitted to oversubscribe;
determining an average amount of bandwidth used by each of the plurality of queues over a plurality of time intervals; and
reallocating a portion of the fraction of the total bandwidth from a first one of the plurality of queues to one or more other ones of the plurality of queues based on the average amount of bandwidth used by each of the plurality of queues, the fraction of the total bandwidth allocated to the first queue, and the rate-control parameter associated with each of the plurality of queues.

17. The method of claim 16, further comprising:
reading the rate-control parameter associated with each of the plurality of queues;
identifying which of the plurality of queues are permitted to oversubscribe based on the associated rate-control parameter; and
determining a manner for reallocating the portion of the fraction of the total bandwidth from the first queue to the identified queues.

18. The method of claim 16, further comprising:
reclaiming at least some of the portion of the fraction of the total bandwidth for the first queue when needed by the first queue.

19. The method of claim 16, where reallocating the portion of the fraction of the total bandwidth includes:
distributing, in a current time interval, excess bandwidth from the first queue among the one or more other ones of the plurality of queues in proportion to bandwidth used by the one or more other ones of the plurality of queues in previous time intervals.

20. The method of claim 16, further comprising:
associating a priority parameter with each of the plurality of queues; and
selecting a queue of the plurality of queues to service based on the priority parameter associated with each of the plurality of queues.

21. The method of claim 16, further comprising:
determining whether the average amount of bandwidth used by the first queue is less than the fraction of the total bandwidth allocated to the first queue; and
identifying an unused portion of the fraction of the total bandwidth allocated to the first queue for reallocation to the one or more other ones of the plurality of queues when the average amount of bandwidth used by the first queue is less than the fraction of the total bandwidth associated with the first queue.

* * * * *